No. 787,746.

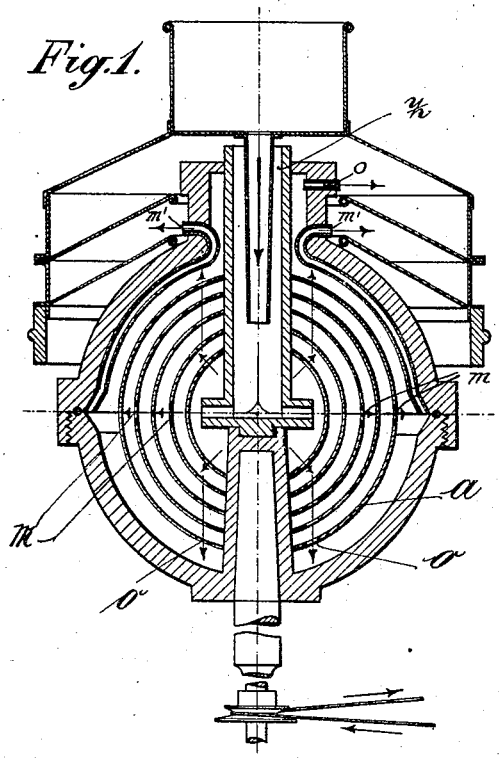
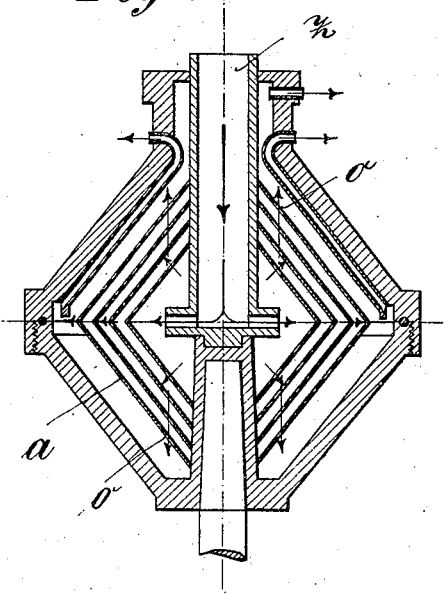
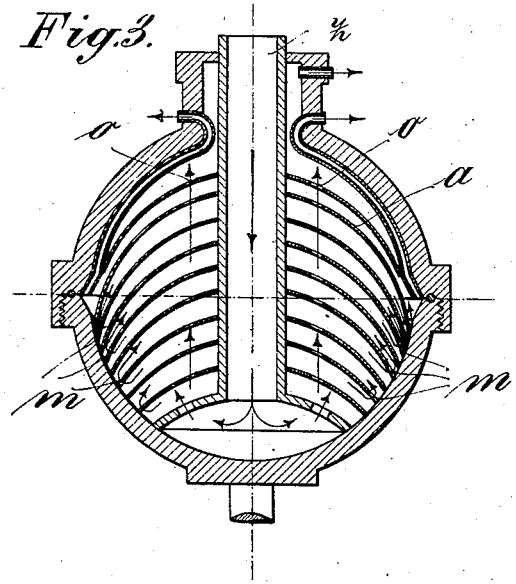
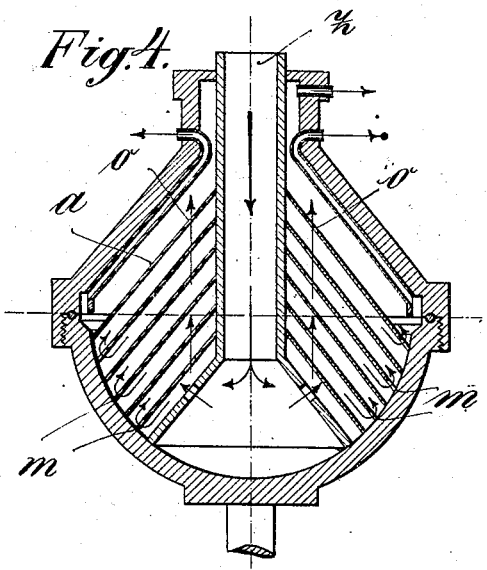

Patented April 18, 1905.

UNITED STATES PATENT OFFICE.

JOHANN IGNAZ FRIEDRICH, OF DÜSSELDORF, GERMANY.

CENTRIFUGAL LIQUID-SEPARATOR.

SPECIFICATION forming part of Letters Patent No. 787,746, dated April 18, 1905.

Application filed February 26, 1901. Serial No. 48,939.

*To all whom it may concern:*

Be it known that I, JOHANN IGNAZ FRIEDRICH, a citizen of Germany, and a resident of Düsseldorf, Germany, have invented certain new and useful Improvements in Centrifugal Separators, of which the following is a specification.

This invention relates to an improved centrifugal separator for quickly and thoroughly separating the cream from the milk.

In the accompanying drawings, Figure 1 is a longitudinal section through my improved centrifugal separator. Figs. 2, 3, and 4 are similar sections through modifications thereof.

In Fig. 1 a series of spheres $a$, and in Fig. 2 a series of double cones $a$, are nested one within the other, so that their inner ends are equidistant from the axis of the separator. In Fig. 3 a number of hemispheres are arranged above one another.

The milk enters a central tube $z$ and flows through lateral nozzles into the innermost chamber. This chamber is surrounded by a nest of additional chambers that communicate with one another at their center or neutral zone by staggered openings $m$. The chambers also communicate with each other by upper and lower openings $o$, formed along the axis of the apparatus and arranged in alinement with each other. From the innermost chamber the milk passes consecutively through the outer chambers by means of the transposed openings $m$, so that the milk must traverse each of the chambers before being discharged into the succeeding chamber. While traversing any one chamber the milk will be relieved of part of its cream, such separated cream passing off through the openings $o$. From near the axis of the outermost chamber the cream escapes through outlet $o'$. The skimmed milk is discharged from the neutral zone of the outermost chamber by outlets $m'$. The passage of the skim-milk from chamber to chamber is effected through alternately-arranged openings $m$. The various chambers will rotate all in one and the same direction as controlled by the rotation of the drum, and each division or layer of the milk will progress in its own particular zone only. Thus the milk proper or full milk will flow along the neutral zone, the skim-milk along the skim-milk zone, while the cream passes from the various chambers freely out around the common axis. The various partitions must therefore be arranged at an inclination toward the axis and grouped around the same, with their ends at equal distances. The shape of the partitions can be spherical, coniform, or similar, such as coniform partitions in spherical shells of superposed spherical partitions in coniform shells. Thus with various forms various combinations can be arranged and the upper or lower halves only of Figs. 1 and 2 may be employed.

What I claim is—

A separator composed of an inlet-pipe, surrounding partitions to form a series of nested chambers which communicate with each other by a first set of alined perforations along the inlet-pipe and by a second set of staggered perforations at points of the partitions located at the greatest distance from the inlet-pipe, and means for separately discharging the cream and the skimmed milk from the outermost chamber, substantially as specified.

Signed by me at Düsseldorf, Germany, this 13th day of February, 1901.

JOHANN IGNAZ FRIEDRICH.

Witnesses:
   WM. ESSENWEIN,
   P. LIEBER.